United States Patent

[11] 3,626,375

[72] Inventors Leo B. Koziol Livonia; William P. Y. Mao, Plymouth, both of Mich.
[21] Appl. No. 22,761
[22] Filed Mar. 26, 1970
[45] Patented Dec. 7, 1971
[73] Assignee Burroughs Corporation Detroit, Mich.

[54] SWITCHING DATA SET
8 Claims, 15 Drawing Figs.

[52] U.S. Cl. .......... 340/172.5
[51] Int. Cl. .......... G06f 3/00
[50] Field of Search .......... 340/172.5, 163, 167 A; 328/111, 112; 307/234; 179/15 BA

[56] References Cited

UNITED STATES PATENTS

| | | | |
|---|---|---|---|
| 3,193,768 | 7/1965 | Scheyhing et al. | 328/112 X |
| 3,261,920 | 7/1966 | Aaron | 179/15 |
| 3,407,387 | 10/1968 | Looschen et al. | 340/172.5 X |

*Primary Examiner*—Raulfe B. Zache
*Attorneys*—Kenneth L. Miller and Edwin W. Uren

ABSTRACT: A switching data set to be utilized in an online data processing system having two different terminal units at the remote site. The switching data set is responsive to a special control signal indicating which terminal unit is to be connected on the line. The control signal is generated by a central processing unit and transmitted over the same data transmission lines as is the data information.

INVENTORS.
LEO. B. KOZIOL.
WILLIAM P. Y. MAO.

BY Russell C. Wells

ATTORNEY.

FIG. 3.
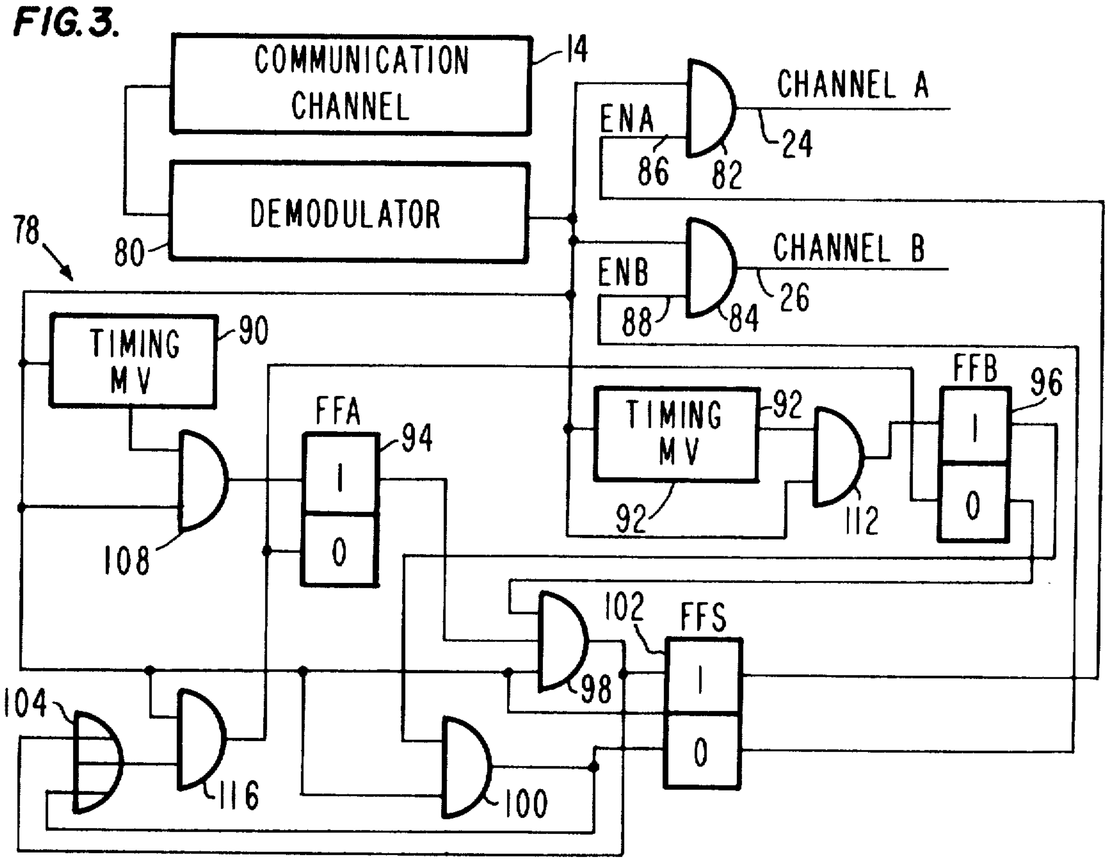
FIG. 4.
FIG. 4A.
FIG. 4B.
FIG. 4C.
FIG. 4D.
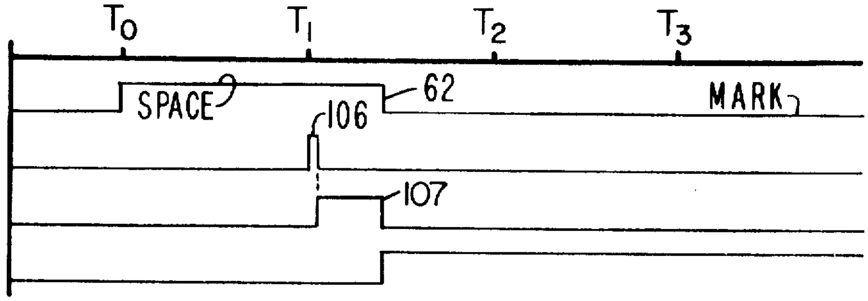
FIG. 5.
FIG. 5A.
FIG. 5B.
FIG. 5C.
FIG. 5D.
FIG. 5E.
FIG. 5F.
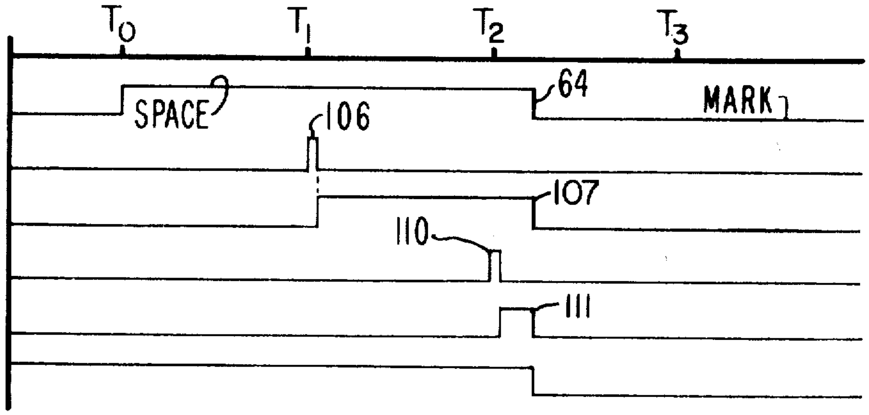

SWITCHING DATA SET

CROSS-REFERENCE TO RELATED APPLICATION

This invention relates to apparatus which may be used in a digital processing system such as that which is described and claimed in the copending application Ser. No. 880,772 entitled "Data Communication System For Servicing Two Different Types of Remote Terminal Units Over A Single Transmission Line" filed by Hynes et al. on Nov. 28, 1969 and assigned to the same assignee as this application.

FIELD OF INVENTION

This invention relates to online data processing systems in general and more particularly to a modem which is responsive to a transmitted signal to electronically switch a remote modem output to one of two different types of remote terminal units.

SUMMARY OF INVENTION

A remote switching data set for controlling the transmission of data between a central processor and either of two different remote terminal units, the central processor having means for generating an electrical signal at either one of two voltage levels identified as either a mark or space signal. The generated electrical signal has a different predetermined period of time for each remote terminal unit. Modulation means is responsive to the electrical signal for modulating the electrical signal over a communication channel and demodulation means at the end of the communication channel restores the modulated signal to the voltage level which is characteristic of the modulation frequency. First and second timing means are responsive to the demodulated signal and each timing means generates an output coincident with said demodulated signal and a period of time after the receipt of said demodulated signal. The outputs of said first and second timing means are combined together to select one of said two remote terminal units for electronically connecting said selected remote terminal unit to the communication line.

IN THE DRAWINGS:

FIG. 3 is a schematic block diagram of the switching control network of the switching data set;

FIG. 4 are timing diagrams illustrating the selection of one terminal unit on channel A wherein;

FIG. 4A is a voltage signal at the output of the demodulator of FIG. 3;

FIG. 4B is a voltage signal generated from one of the timing multivibrators of FIG. 3;

FIG. 4C is a voltage signal at the one output of FFA of FIG. 3;

FIG. 4D is voltage at the one output of FFS of FIG. 3;

FIG. 5 are timing diagrams illustrating the selection of one terminal unit on channel B wherein;

FIG. 5A is a voltage signal at the output of the demodulator of FIG. 3;

FIG. 5B is a voltage signal generated from one of the timing multivibrators of FIG. 3;

FIG. 5C is a voltage signal at the one output of FFA of FIG. 3;

FIG. 5D is a voltage signal generated from the other timing multivibrator of FIG. 3;

FIG. 5E is a voltage signal at the one output of FFB of FIG. 3; and

FIG. 5F is voltage at the one output of FFS of FIG. 3.

DETAILED DESCRIPTION

Figures 1, 2:
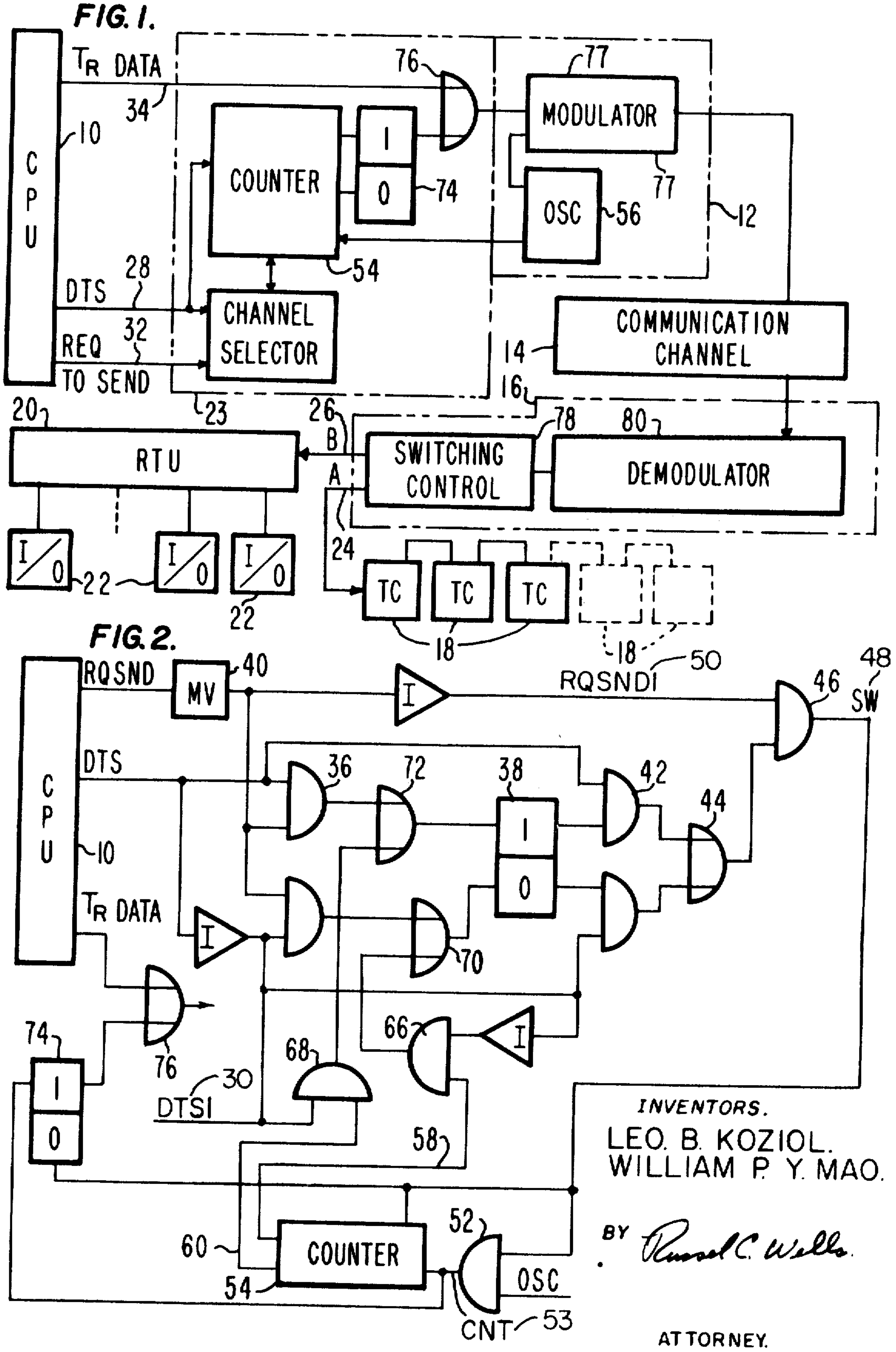
FIG. 1 is a block diagram of a communication system embodying the switching data set.
FIG. 2 is a schematic block diagram of a data set control unit.

Referring to the FIGS. by the characters of reference, there is shown in FIG. 1 a block diagrammatic representation of a data processing system comprising a central processing unit or CPU 10, a first data set 12, a communication channel 14, a switching data set 16 and a plurality of terminal computers 18 and a remote terminal unit or RTU 20 controlling a plurality of input-output machines 22. The system as shown in FIG. 1 is used in an online computing system wherein the central processing unit 10 processes information for several remote terminal stations.

As shown in FIG. 1, the switching data set 16 controls a plurality of terminal computers 18 connected in concatenation and having one set of operating characteristics and controlling through a remote terminal unit 20, a second plurality of input-output machines 22 having a different set of operating characteristics. In particular, these operating characteristics are functions of the transmission rates, transmission codes, and line discipline procedures to which the different remote machines 18 or 22 respond. By way of example, the terminal computers 18 may have a transmission rate of 1,200 Baud and are adapted to receive the seven bit ASCII codes with one line discipline procedure an example of which is the Data Processing Apparatus issued Feb. 16, 1971 by Perkins et al. with U.S. Pat. No. 3,564,509 and assigned to the same assignee. The remote terminal unit 20 may have a transmission rate of 1,000 Baud and is adapted to receive BCD code with a different line discipline procedure for the input-output machines 22.

The terminal computers 18 are responsive to a pole-select line discipline whereby the central processing unit 10 can select a particular one of the terminal computers 18. The input-output machines 22 shown in FIG. 1 are connected to the data switching set 16 by a remote terminal unit or multiple control unit 20 responsive to a line discipline procedure controlling the selection of any one or more than one input-output machines 22 which are connected thereto. Such a system has application in the financial industry where the CPU is located at the main office of a bank and the terminal computers 18 and the remote terminal unit 20 including the input-output machines 22 are located at branch banks. An example of an input-output machine such as found in the preferred embodiment is a teller's window machine.

The data set 12 and the switching data set 16 have the basic capabilities of the data set described in the patent application entitled Data Set System Employing Active Filters and Multivibrator Timing, filed on Jan. 22, 1971, U.S.S.N. 109,056 which is a continuation-in-part of U.S. Ser. No. 782,963, and assigned to the same assignee as this application, with the addition to the first data set 12 of a control unit 23 for generating a control signal for switching the output of switching data set 16 to one of a plurality of different data transmission channels.

In the present embodiment according to FIG. 1 the central processing unit 10 controls the transfer of information therefrom to the several terminal units 18 or 22 connected online. The central processing unit selects the particular terminal unit it desires which then identifies the output channel A 24 or B 26 of the switching data set 16. In the preferred embodiment there is shown only two output data transmission channels, namely, A and B although it is apparent that according to the teachings of this invention that one skilled in the art could provide more than the two output channels. The central processing unit generates a direct current voltage control signal DTS 28 to the data set 12 indicating which output channel 24 or 26 is to be selected.

The data set 12 which is operatively connected to the central processing unit 10 may comprise the means for converting the voltage control signal into the correct predetermined time period for selecting the desired output channel at the data set 16. The schematic of FIG. 2 illustrates the circuit means for converting direct current voltage control signal into a space data signal having a predetermined time period.

The central processing unit 10 generates the data terminal select signal, DTS 28, which for the purposes of illustration has the following definition:

DTS indicates that output channel A is to be selected.

DTS/ indicates that output channel B is to be selected.

It will be shown that DTS will effect the generation of the space data signal illustrated in FIG. 4A and DTS/ 30 (FIG. 2) will effect the generation of the space data signal illustrated in FIG. 5A. The central processing unit 10 also generates a request to send signal, RQSND 32, which initializes the transmission system and TRDATA 34 which is the data to be transmitted.

For the purposes of illustration, the central processing unit 10 will generate DTS 28 for selection of channel A. This signal 28 is applied to one input of a first AND gate 36 to set a control flip-flop 38, FFC, to its true output. The other input is connected to the output of monostable multivibrator 40 wherein its output voltage level is normally permissive or true except when the system is first turned on. The triggering signal for the multivibrator is the RQSND 32 signal and this signal remains true or positive whenever the data transmission system is functioning. For the purposes of illustration, the output of multivibrator 40 is positive when true. The control flip-flop 38 may be a J–K flip-flop with positive triggering.

The effect of the DTS signal is to set the control flip-flop 38 whereby its TRUE or ONE output is positive. This signal FFC is combined in a second AND gate 42 with the DTS signal and applied through an OR gate 44 to third AND gate 46. The output of the third AND gate 46 is a switch signal identified as SW 48 and has the following equation:

$$SW=[(DTS\cdot FFC)+(DTS/\cdot FFC/)]\cdot RQSND/$$

The signal *RQSND/* 50 is the inverted output from the previously identified monostable multivibrator 40.

The *SW* signal 48 is applied to fourth AND gate 52 and to the reset inputs of the several J–K flip-flops which comprise a counter 54. The counter 54 is a well known ripple counter wherein a plurality of JK flip-flops are electrically connected in cascade by connecting the TRUE or ONE output from one flip to the trigger input of the next succeeding flip-flop. The *SW/* signal which is the normal output of the AND gate 46 will cause the counter to be reset to zero when applied to the reset terminals of each counter flip-flop. The *SW* signal permits the counter to count.

The fourth AND gate 52 generates a counting signal CNT, 53 which is defined as:

$$CNT=OSC\cdot SW$$

where *OSC* is the output of the data set oscillator 56 such as is specified in U.S. Ser. No. 782,963 mentioned above.

In FIG. 2, there are shown two outputs 58 and 60 from the counter 54 which represent the number of CNT pulses counted to produce the voltage control signal 62 shown in FIG. 4A or the signal 64 shown in FIG. 5A. The first output 58 of the counter 54 is gated in the fifth AND gate 66 with DTS and the second output of the counter is gated in the sixth AND gate 68 with DTS/. The function of the output signal from these two AND gates 66 and 68 is to compliment the control flip-flop 38. Therefore, the output from the fifth AND gate 66 is applied through an OR gate 70 to the K input of the control flip-flop 38 and the output from the sixth AND gate 68 is applied through another OR gate 72 to the J input of the control flip-flop 38.

The output from the fifth AND gate 66 occurs at smaller or lower count than the output from the sixth AND gate 68.

The CNT signal 53 is also applied to the J input of a space output flip-flop 74 which when set generates space data signal. This flip-flop 74 remains set for a period of time as determined by the counter 54 and is reset by the SW/ signal applied to its reset terminal. The output of this flip is gated with the TRDATA signal 34 and is applied through the OR gate 76 to the data set modulator 77 to be modulated for transmission over the communication channel 14.

The communication channel is operatively connected between the data set and the switching data set. The channel may be either a two or four wire telephone system. The signals from the data set are transmitted over the communication channel and are received by the switching data set where they are demodulated and applied to the switching control network for selecting the data transmission channel for the passage of transmitted data.

The switching control network 78 for selecting the output channel 24 or 26 of the switching data set 16 is shown in the logical diagram of FIG. 3 wherein the demodulator 80 may be of the type described in previously identified data set application which is incorporated herein by reference. The output of the demodulator 80 such as shown in FIG. 4 or 5 is a binary valued direct current voltage signal wherein the upper voltage level or more positive level is defined as a space signal and the lower or more negative voltage level is defined as a mark signal. As shown in FIG. 3, the output of the demodulator 80 is connected to two AND gates 82 and 84 which are individually controlled by an enabling signal ENA 86 and ENB 88 respectively. Referring to FIG. 1, the output of the ENA controlled AND gate 82 is connected to the terminal computers 18 on channel A 24 and the ENB controlled AND gate 84 is connected to the remote terminal unit 20 on channel B 26. The output of the demodulator 80 is also connected to the switching control network 78 for selection of the proper channel 24 or 26.

In the preferred embodiment, the switching control signal 62 or 64 is a space signal which remains at the space voltage level for a period of time. One limitation of the switching control signal 62 or 64 is that it must remain as a space signal for a period of time greater than that required for representation of data in data transmission. Such a signal is shown in FIG. 4A and FIG. 5A. The switching control network 78 comprises a first 90 and second 92 timing means each coupled to a separate storage means FFA 94 and FFB 96 for retaining the results of their respective timing means. The outputs of the storage means 94 and 96 are selectively gated in two control gates 98 and 100 to control the selection flip-flop 102. The true output of the selection flip-flop 102 is the enabling signal ENA 86 and the false output is the enabling signal ENB 88.

The first and second timing means 90 and 92 as shown in FIG. 3 comprise monostable multivibrators which generate an output pulse at a predetermined period of time after receipt of the input pulse. Both timing means 90 and 92 are positive triggered in that the transition of the input pulse from the demodulator 80 from a mark to space condition initiates the timing of the multivibrator. Each timing means controls its own separate storage means or flip-flop 94 or 96 for retaining the characteristic as respects time duration of the switching control signal 62 or 64. The outputs of these two flip-flops 94 and 96 control input to the selection flip-flop 102 wherein the true output ENA 86 switches the output of the switching data set 16 from channel B to A and the false output ENB 88 switches the output of the switching data set 16 from channel A to channel B.

The central processing unit 10 generates the switching signal by a mark to space transition for a particular period of time depending upon the desired output channel. As illustrated in FIGS. 4A through 4D, if the central processing unit 10 desires to select the output channel A 24, a mark to space or spacing signal is generated having a period of time greater than $T_1$ and less than $T_2$. This signal is modulated for transmission by the data set 12 in a manner similar to that described for channel A, and is received by the demodulator 80 from the communication channel 14. As shown in FIG. 3, the signal output of the demodulator 80 is supplied to both timing means 90 and 92. Upon receipt of the signal transition from mark to space both multivibrators are actuated. In the preferred embodiment, the unstable state of the second timing means 92 has a timing duration which is longer than the unstable state of the first timing means 90. At $T_1$ time of the switching control signal 62 the first multivibrator times out generating a first pulse 106 such as shown in FIG. 4B from the first timing means 90.

The pulse output 106 of the first timing means 90, as shown in FIG. 4B is gated in the first AND gate 108 with the switching control signal 62 to set the first flip-flop 94 or FFA. The timing means 90 is so constructed that it will generate an output signal only if the input switching control signal 62 is present, therefore, in a normal data transmission since the space signal has a shorter duration of time than the switching control signal 62, the timing means 90 will not time out and generate an output pulse 106. The true output 107 of the flip-flop 94 is gated in the control AND gate 98 with two other control signals, namely, the zero output of the second storage flip-flop 96 or FFB and the switching control signal 62 to set the selection flip-flop 102.

However, if the central processing unit 10 generates the switching signal 64 as shown in FIG. 5A, channel B 26 will be selected. As previously indicated, the output from the demodulator 80 is supplied to both timing means 90 and 92. At $T_1$ time the first timing means 90 generates an output pulse 106 shown in FIG. 5B which is supplied through AND gate 108 to set FFA 94 generating the true output signal 107. This is illustrated in FIG. 5C. At $T_2$ time of the switching control signal 64, the second timing means 92 generates an output pulse 110 as illustrated in FIG. 5D. This pulse 110 is supplied through the second AND gate 112 with the switching control signal 64 to set FFB 96 generating the true or ONE output 111 of the flip-flop 96. This output 111 is gated in the control AND gate 100 with the switching control signal 64 to reset the selection flip-flop 102.

The triggering signal for the selection flip-flop 102 effects switching of the flip-flop at the negative transition of the switching control signal from the space data level to the mark data level. This clocking signal prevents any undesired switching because of the timing difference between the two timing means 90 and 92. As previously indicated, the output state of the selection flip-flop 102 generates the ENA 86 and ENB 88 signals to control AND gate 82 and 84. FIGS. 4D and 5F illustrate the one or true output of FFS 102.

The two storage flip-flops 94 and 96 are also reset by either of negative going switching control signals 62 or 64 which are combined in the AND gate 116 with the signal from the OR gate 104. The switching control network 78 is now ready to receive the next switching signal.

In the schematic of FIG. 3, all of the flip-flops are negative triggering flip-flops of the conventional J–K type. The selection flip-flop 102 has a trigger or clock input which controls the switching of the flip-flop and for all the others the negative transition on either the J or K input controls the switching of the flip-flop. In the selection flip-flop 102, the flip-flop will change state or switch only when the trigger signal goes negative and either the J or K input is positive. The AND and OR gates in both FIGS. 2 and 3 follow conventional definitions for positive logic.

There has been shown and described an online data processing system embodying a switching data set. The switching data set is responsive to a switching control signal from the data transmission channel to connect the communication channel to either a terminal computer or to a remote terminal unit or multiple control unit.

What is claimed is:

1. In a data processing system, a remote switching data set for controlling the transmission of data between a central processor and either one of two different remote terminal units, said remote switching data set comprising:

means in the central processor for generating an electrical signal at either one of two voltage levels, said signal having a predetermined period of time, modulating means operatively coupled to said aforementioned means for transforming said signal into a modulated signal, a communication channel adapted for transmitting said modulated signal, demodulation means for demodulating said modulated signal to one of the two voltage levels, first timing means responsive to said one voltage level for generating a first signal a predetermined time after the receipt of said voltage level, second timing means responsive to said one voltage level for generating a second signal a predetermined time after the receipt of said voltage level, and selection means responsive to said first signal for selecting one of the remote terminal units and responsive to said second signal for selecting the other of the remote terminal units, said selected remote terminal unit being operatively coupled to said demodulation means through said selection means.

2. A remote switching data set according to claim 1 wherein said first and second timing means are first and second monostable multivibrators respectively and wherein the unstable state of said second multivibrator is of longer duration than the unstable state of said first multivibrator.

3. A switching data set for selection one of a plurality of data transmission channels, said switching data set comprising:

means for receiving an electrical signal from a communication channel, said signal having a first modulated signal representing a mark data signal and having a second modulated signal representing a space data signal, demodulating means responsive to said first modulated signal for generating a first direct current voltage level and responsive to said second modulated signal for generating a second direct current or voltage level, first timing means responsive to the transition from the first to the second direct current voltage level for generating a third signal a predetermined time after receipt of the transition and coincidence with said second direct current voltage level, second timing means responsive to the transition from the first to the second direct current voltage level for generating a fourth signal a predetermined time after receipt of the transition and coincidence with said second direct current voltage level, and channel selection means responsive to said third signal for selecting one of the data transmission channels and responsive to said fourth signal for selecting the other of the data transmission channels, said channel selection means operatively coupling the selected data transmission channel to said modulating means.

4. A switching data set according to claim 3 wherein said first and second timing means are monostable multivibrators respectively.

5. A switching data set according to claim 4 wherein said fourth signal generated by said second multivibrator occurs a period of time after said third signal generated by said first multivibrator and the generation of said fourth signal negates the channel selection of said third signal.

6. A switching data set according to claim 4 wherein the timing period of the unstable state of both of said multivibrators is of a longer time duration than the longest space data signal during data transmission.

7. In a data processing system having a central processing unit operatively connected online to a command data set at one end of a telephone network and through a switching data set at the other end of the telephone network to either one of two different remote terminal unit channels, the command data set comprising:

oscillation means generating a series of pulses at either one of two different pulse frequencies, modulation means operatively coupled to said oscillation means for modulating data information over said telephone lines, channel selection means responsive to command signals from the central processing unit for selecting one or the other of the remote terminal unit channels and operable for generating a channel selection control signal in response to said selection, and a timer responsive to said channel selection control signal and said oscillation means and operable for providing a first electrical signal of a first predetermined time period to said modulation means for selecting one of the remote terminal unit channels and operable for providing a second electrical signal of a second predetermined time period to said modulation means for selecting the other of the remote terminal unit channels.

8. In the command data set a according to claim 7 wherein said timer is a ring counter and said first predetermined time period comprises a count which is less than the count of said second predetermined time period.

* * * * *